US012758457B1

(12) United States Patent
Spencer

(10) Patent No.: US 12,758,457 B1
(45) Date of Patent: Oct. 13, 2026

(54) HAND WRIST FOREARM STRETCH APPARATUS AND METHOD OF STRETCHING

(71) Applicant: Spence Spencer, Phoenix, AZ (US)

(72) Inventor: Spence Spencer, Phoenix, AZ (US)

( * ) Notice: Subject to any disclaimer, the term of this patent is extended or adjusted under 35 U.S.C. 154(b) by 922 days.

(21) Appl. No.: 18/096,004

(22) Filed: Jan. 11, 2023

Related U.S. Application Data

(60) Provisional application No. 63/298,242, filed on Jan. 11, 2022.

(51) Int. Cl.
*A61H 1/02* (2006.01)
*A61H 23/00* (2006.01)

(52) U.S. Cl.
CPC ........... *A61H 1/0285* (2013.01); *A61H 23/00* (2013.01); *A61H 2201/1638* (2013.01); (Continued)

(58) Field of Classification Search
CPC ...... A61H 1/02; A61H 1/0285; A61H 1/0288; A61H 2201/1635–1638; (Continued)

(56) References Cited

U.S. PATENT DOCUMENTS 1,981,379 A * 11/1934 Thomson ............... A63B 23/10 601/28
2,476,518 A * 7/1949 Underwood ........... G09B 15/06 601/40
(Continued)

FOREIGN PATENT DOCUMENTS

CN 209967004 U * 1/2020
CN 215127009 U * 12/2021
(Continued)

OTHER PUBLICATIONS

English translation for CN 114246760, machine translated by espacenet.com.*
(Continued)

*Primary Examiner* — Tu A Vo
(74) *Attorney, Agent, or Firm* — Invention To Patent Services; Alex Hobson

(57) ABSTRACT

A hand wrist and forearm stretch apparatus utilizes a specific geometry of contacts to allow stretching of the hand and forearm by enabling pressure on both the palm while flexing and extending the fingers. This produces trigger points on the palm to enable effective stretching of the hand and forearm, including muscles, ligaments and tendons and nerves. An upper extension extends vertically upward to a top from a middle-landing having a middle-landing protrusion, which may have a curved convex surface for engagement with the palm. A base-landing configured proximal to the base also has a curved convex surface for engagement with the palm. The base-landing protrusion may by rod shaped while the middle-landing protrusion may be dome shaped. Recesses are configured between the middle-landing protrusion and the upper extension and between the base-landing protrusion and the middle-landing, to enable flexing of the hand into this recess during stretching.

19 Claims, 10 Drawing Sheets

(52) U.S. Cl.
CPC .... *A61H 2205/06* (2013.01); *A61H 2205/065* (2013.01); *A61H 2205/067* (2013.01)

(58) Field of Classification Search
CPC ........ A61H 2205/065–067; A61H 2201/0153; A61H 39/04; A61H 23/00–0263; A61H 2023/002–029
See application file for complete search history.

(56) References Cited

U.S. PATENT DOCUMENTS

| | | | | | |
|---|---|---|---|---|---|
| 2,752,915 | A * | 7/1956 | Riblet | A61H 15/00 601/118 |
| 3,707,961 | A * | 1/1973 | Duplessis | A61H 23/0263 601/65 |
| 4,329,981 | A * | 5/1982 | Dungl | A61H 7/001 601/28 |
| 5,577,997 | A * | 11/1996 | Thariani | A61H 7/003 601/135 |
| 5,643,164 | A * | 7/1997 | Teff | A63B 23/08 482/79 |
| 5,913,839 | A * | 6/1999 | Wincek | A61H 15/00 601/134 |
| 6,234,986 | B1 * | 5/2001 | Raffo | A61H 23/0263 601/72 |
| 6,482,168 | B1 * | 11/2002 | Betcher | A61F 5/0118 128/878 |
| D471,605 | S * | 3/2003 | Teff | D21/688 |
| 6,623,270 | B1 * | 9/2003 | Meldeau | A63B 21/4039 432/140 |
| 6,942,604 | B2 * | 9/2005 | Teff | A63B 21/0552 482/79 |
| 8,998,832 | B2 * | 4/2015 | Almeida | A61H 9/0078 601/134 |
| D876,122 | S * | 2/2020 | Hu | D6/582 |
| 11,324,347 | B2 * | 5/2022 | Rindlisbacher | A47G 27/0231 |
| 2006/0004308 | A1 * | 1/2006 | Yamauchi | A61H 39/04 601/134 |
| 2010/0071705 | A1 * | 3/2010 | Alviso | A61F 5/0118 128/845 |
| 2012/0028764 | A1 * | 2/2012 | Miller | A63B 23/14 482/44 |
| 2016/0174745 | A1 * | 6/2016 | Feeley | A47G 27/0231 428/80 |
| 2017/0172331 | A1 * | 6/2017 | Publicover | B32B 7/022 |
| 2019/0380906 | A1 * | 12/2019 | Lin | A61H 15/00 |
| 2020/0093675 | A1 * | 3/2020 | Hale | A43B 7/146 |
| 2020/0179211 | A1 * | 6/2020 | Zanyk | A63B 23/10 |
| 2022/0233009 | A1 * | 7/2022 | Feeley | A47G 27/0231 |

FOREIGN PATENT DOCUMENTS

| | | | | |
|---|---|---|---|---|
| CN | 114246760 A * | 3/2022 | A61H 1/0285 |
| JP | H0713566 U * | 3/1995 | |
| WO | WO-2012120393 A2 * | 9/2012 | A63B 21/4035 |
| WO | WO-2013068569 A2 * | 5/2013 | A61H 23/00 |

OTHER PUBLICATIONS

English translation for CN 209967004, machine translated by espacenet.com.*
English translation for WO 201306856, machine translated by espacenet.com.*

* cited by examiner

HAND WRIST FOREARM STRETCH APPARATUS AND METHOD OF STRETCHING

CROSS REFERENCE TO RELATED APPLICATIONS

This application claims the benefit of priority to U.S. provisional patent application No. 63/298,242, filed on Jan. 11, 2022; the entirety of which is hereby incorporated by reference herein.

BACKGROUND OF THE INVENTION

Field of the Invention

The invention relates to a hand, wrist and forearm stretch apparatus and method of stretching using said apparatus.

Background

Stretching the forearm and hand is important for people that have jobs requiring a lot of typing and for athletes that engage their forearm and hands regularly, such as baseball pitchers, quarterbacks and other athletes that throw balls, racquet sports players, golfers, rock climbers and the like. Without proper stretching and treatment, muscles of the forearm can get tight and this can lead to chronic painful conditions, such as carpal tunnel syndrome and radial tunnel syndrome.

Carpal tunnel syndrome is caused by pressure on the median nerve. The carpal tunnel is a narrow passageway surrounded by bones and ligaments on the palm side of your hand. When the median nerve is compressed, the symptoms can include numbness, tingling and weakness in the hand and arm.

The radial nerve controls motor functions of the arm, such as rotating the forearm and straightening the wrist and fingers. Radial tunnel syndrome occurs when the radial nerve is compressed as it travels through the radial tunnel in your forearm.

SUMMARY OF THE INVENTION

The invention is directed to a hand wrist and forearm stretch apparatus that utilizes a specific geometry of contacts to allow stretching of the hand and forearm by enabling pressure on both the palm while flexing and extending the fingers. This produces trigger points on the palm to enable effective stretching of the hand and forearm, including muscles, ligaments and tendons and nerves.

An exemplary hand wrist and forearm stretch apparatus has a stretch surface extending from a base-landing up along a middle-base extension to a middle-landing and then from the middle-landing up along the upper extension to a top of the hand wrist and forearm stretch apparatus. This stretch surface may include curved surfaces between portions of the stretch surface and recesses that may include concave surfaces to enable stretching of the hand and wrists. An upper extension extends vertically upward to a top of the hand wrist and forearm stretch apparatus when the hand wrist and forearm stretch apparatus is configured with the base resting on a horizontal surface. The upper extension extends up from a middle-landing and may include an upper-middle recess, which may be a concave surface to form a recess between the top and the middle-landing. A middle-landing extends from the upper extension and has a middle-landing protrusion which may be configured at an extended end of the middle-landing, or between the middle-landing and the middle-base extension. The middle-landing may extend substantially horizontally (withing about 20 degrees of horizontal) between the base and the top of the hand wrist and forearm stretch apparatus. A middle-base extension extends from the middle-landing down to the base-landing an may include a middle-base recess, which may include a concave surface in the stretch surface to provide space for stretching. An upper-middle inflection, or change in curvature may be configured in the stretch surface along the upper extension. Likewise, a middle-base inflection, or change in curvature may be configured in this stretch surface along the middle-base extension.

A middle-landing protrusion may extend outward from the hand wrist and forearm stretch apparatus and may convex in shape and may be spherical in shape, or be a dome shape. The hand wrist and forearm stretch apparatus may have a coves shape from the middle-landing and the middle-base extension and the middle-landing protrusion may extend from the middle-base extension down onto the middle-base extension.

An exemplary hand wrist and forearm stretch apparatus has a base extending along a bottom and is configured to support the hand wrist and forearm stretch apparatus on a surface, such as a horizontal surface for stretching. The base-landing has a base-landing protrusion extending upward from the base-landing which may have a curved convex shape for engagement with the palm. An exemplary base-landing protrusion extends in a radius of curvature such as being spherical in shape, or may be a dome shape. In an exemplary embodiment, the radius of curvature of the base-landing protrusion extends along a length of the hand wrist and forearm stretch apparatus and may be cylindrical in shape. The base-landing and base-landing protrusion are configured more proximal to the base, or bottom, of the hand wrist and forearm stretch apparatus than the middle-landing and middle-landing protrusion. Also, the base landing is configured proximal to the front of the hand wrist and forearm stretch apparatus, as described herein. The middle-base extension extends from the base-landing up to the middle-landing. A middle-base recess may be configured between the base-landing and the middle-base extension, or between the base-landing protrusion and the middle-base extension. A middle-base recess may be configured between the base-landing and the middle-base extension and may be a concave shape in the stretch surface of the hand wrist and forearm stretch apparatus between these two portions. A middle-base inflection, or change in curvature may be configured in this middle-base recess and between the middle-base extension and the base-landing.

An upper protrusion may be configured along the upper extension and proximal to the top of the hand wrist and forearm stretch apparatus to allow a person to wrap their wrist over the top and place their hand on the upper protrusion. The upper protrusion may be a convex shape in the stretch surface along the upper extension. A base-front transition surface may be a curved surface from the base to the base-landing to enable the hand wrist forearm stretch apparatus to be rolled forward, wherein the base is tilted up from the back side. Also note that the hand wrist forearm stretch apparatus may have a curved base-back transition surface to enable the hand wrist forearm to roll toward the back. Both of these transition surfaces may extend in a radius of curvature and may be convex in shape. A stretch may be performed by placing the wrist over the top with the fingers on the upper protrusion and the forearm extending generally along the back. The hand wrist and forearm stretch apparatus may be rolled forward over the base-front transition surface. This stretch may be used to stretch the following parts of the anatomy: extensor carpi radialis *brevis*, extensor digitorum muscle, extensor carpi ulnaris muscle, abductor pollicis longus, extensor pollicis longus, and the extensor pollicis *brevis*.

A first stretch enabled by the hand wrist and forearm stretch apparatus is conducted by placing the palm of the hand on the middle-landing protrusion and pressing down with the fingers extended up onto the upper extension. An upper-middle recess between the middle-landing and the upper extension provides a space for the hand to flex downward between the upper extension and the middle-landing protrusion. The fingers may extend onto the top of the hand wrist and forearm stretch apparatus. This stretch creates a more proximal stretch for stretching muscles, tendons, ligaments proximal to the elbow including but not limited to, the flexor carpi radialis, palmaris longus muscle, flexor digitorum superficialis muscle and the flexor digitorum *profundus* muscle.

A second stretch enabled by the hand wrist and forearm stretch apparatus is conducted by placing the palm of the hand on the base-landing protrusion and pressing down with the fingers extended up onto the middle-landing protrusion. The base-middle recess between the base-landing and the middle-landing protrusion provides a space for the hand to flex downward between the upper extension and the middle-landing protrusion. A single finger, or a plurality of fingers may slide or moved to extend onto the apex of the middle-landing protrusion to engage the muscles and tendons of fingers. This stretch with the hand extending up from the base to the middle-landing has the base-landing protrusion configured behind the distal articular facets of the palm and the phalanx on the middle-landing protrusion. This stretch creates a more distal stretch for stretching the palmer fascia and opens the carpal canal with a focus on the following: flexor digitorum superficialis muscle, flexor pollicis longus muscle, wrist flexors, finger flexors and the lumbrical muscles of the hand.

An exemplary hand wrist and forearm stretch apparatus may be sized to accommodate stretching of the hand, wrist and forearm by placing the hand and pressing down on the apparatus. The height of the exemplary hand wrist and forearm stretch apparatus from the base to the top may be about 15 cm or more, about 20 cm or more, about 25 cm or more, about 30 cm or more, about 35 cm or more and any range between and including the values provided. The length of the exemplary hand wrist and forearm stretch apparatus from the front, proximal to the base-landing protrusion to the back may be about 20 cm or more, about 25 cm or more, about 30 cm or more, about 35 cm or more, about 40 cm or more and any range between and including the values provided. The width of the hand wrist and forearm stretch apparatus from a left side to a right side may be about 8 cm or more, about 10 cm or more, about 12 cm or more, about 15 cm or more about 20 cm or more and any range between and including the width values provided.

The curved surface of the middle-landing protrusion may be configured for engaging and triggering pressure on the palm and may have a radius of curvature of about 25 mm or more, about 35 mm or more, about 50 mm or more, about 60 mm or more and any range between and including the values provided. The curved surface of the base-landing protrusion may be smaller or less than that of the middle-landing protrusion and may have a radius of curvature of about 10 mm or more, about 15 mm or more, about 20 mm or more, about 25 mm or more, about 30 mm or more, about 35 mm or more and any range between and including the values provided. The middle-landing protrusion may extend up from the middle-landing a height of about 25 mm or more, about 30 mm or more, about 40 mm or more, about 50 mm or more and any range between and including the values provided. The middle-landing may be dome shaped for applying pressure to the palm. The base-landing protrusion may have a curved surface but may be cylindrical in shape, extending with a length of the cylinder extending from the left to the right side, wherein the radius of curvature extends from the front to the back of the hand wrist and forearm stretch apparatus. The enables stretching with the base-landing protrusion configured behind the distal articular facets of the palm.

The middle-landing protrusion and/or the base-landing protrusion may have a copper surface or be made out of copper which is know to provide therapeutic effects when contacting the body.

A vibrating apparatus may be configured to vibrate the hand wrist and forearm stretch apparatus or a portion of the hand wrist and forearm stretch apparatus, such as the middle-landing protrusion and/or the base-landing protrusion. Vibration while applying pressure to the middle-landing protrusion or the base-landing protrusion may provide additional therapeutic benefits and may further trigger muscles and tendons while stretching.

The anatomy of the human hand, wrist and forearm are shown in FIGS. 10 to 15 and show the bones, muscles and tendons that may be treated using the hand wrist and forearm stretch apparatus as described herein; these Figures are incorporated by reference herein.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
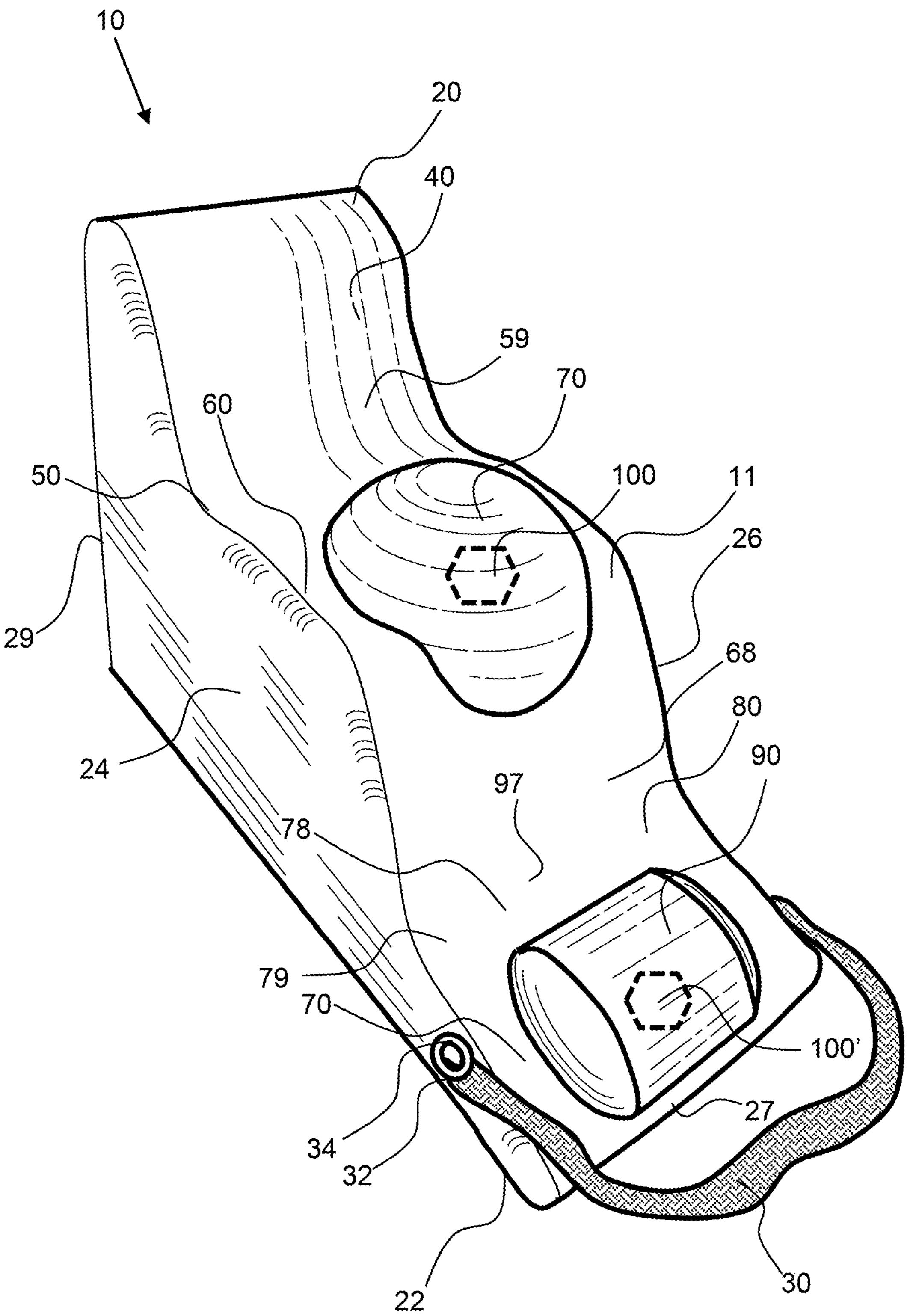
FIG. 1 shows a front, left-side perspective view of an exemplary hand wrist and forearm stretch apparatus (HWF stretch apparatus) having an upper extension, middle-landing, a middle-landing protrusion, a base-landing with a base-landing protrusion.
Figure 2:
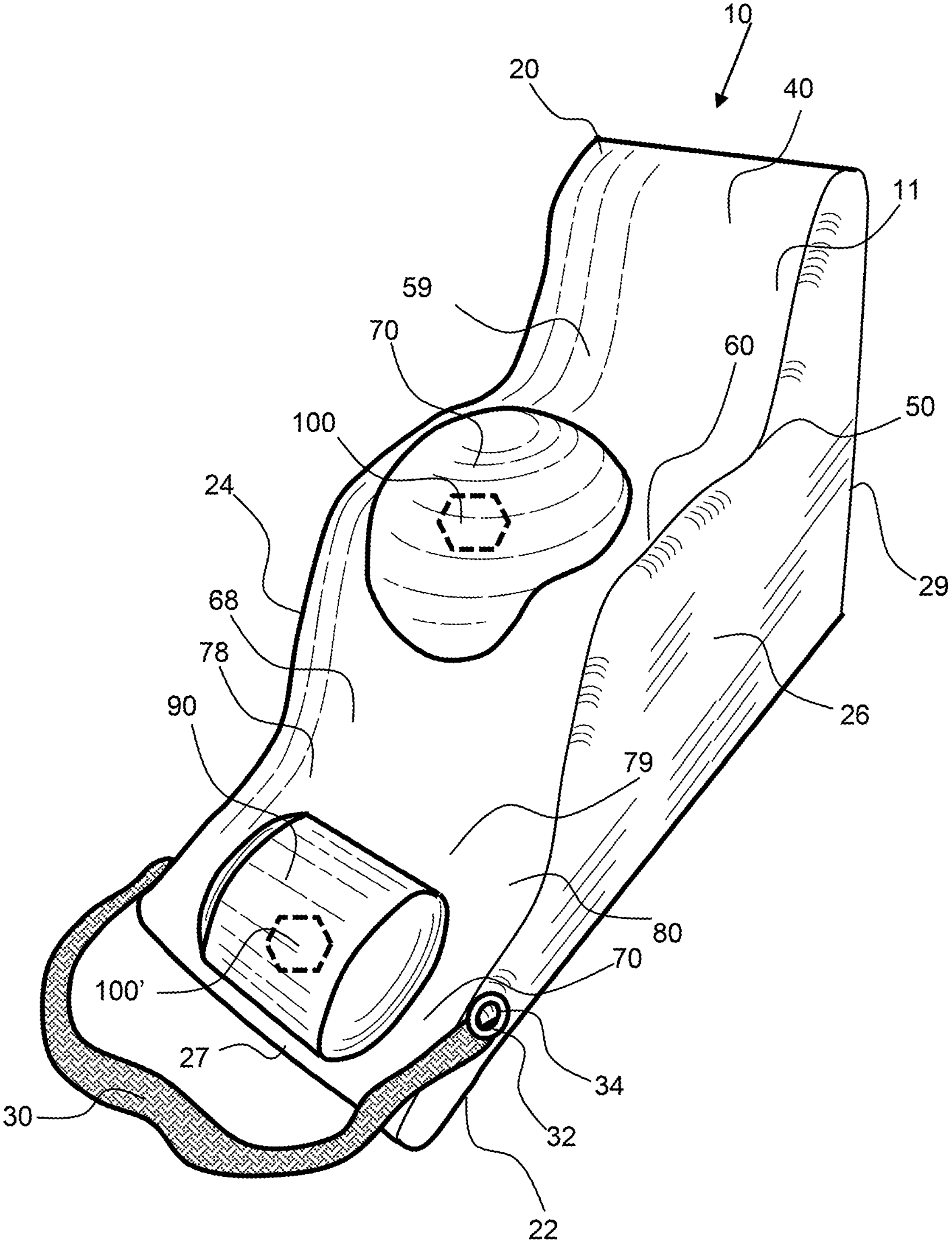
FIG. 2 shows a front, right-side perspective view of an exemplary hand wrist and forearm stretch apparatus (HWF stretch apparatus) having an upper extension, middle-landing, a middle-landing protrusion, a base-landing with a base-landing protrusion.
Figure 3:
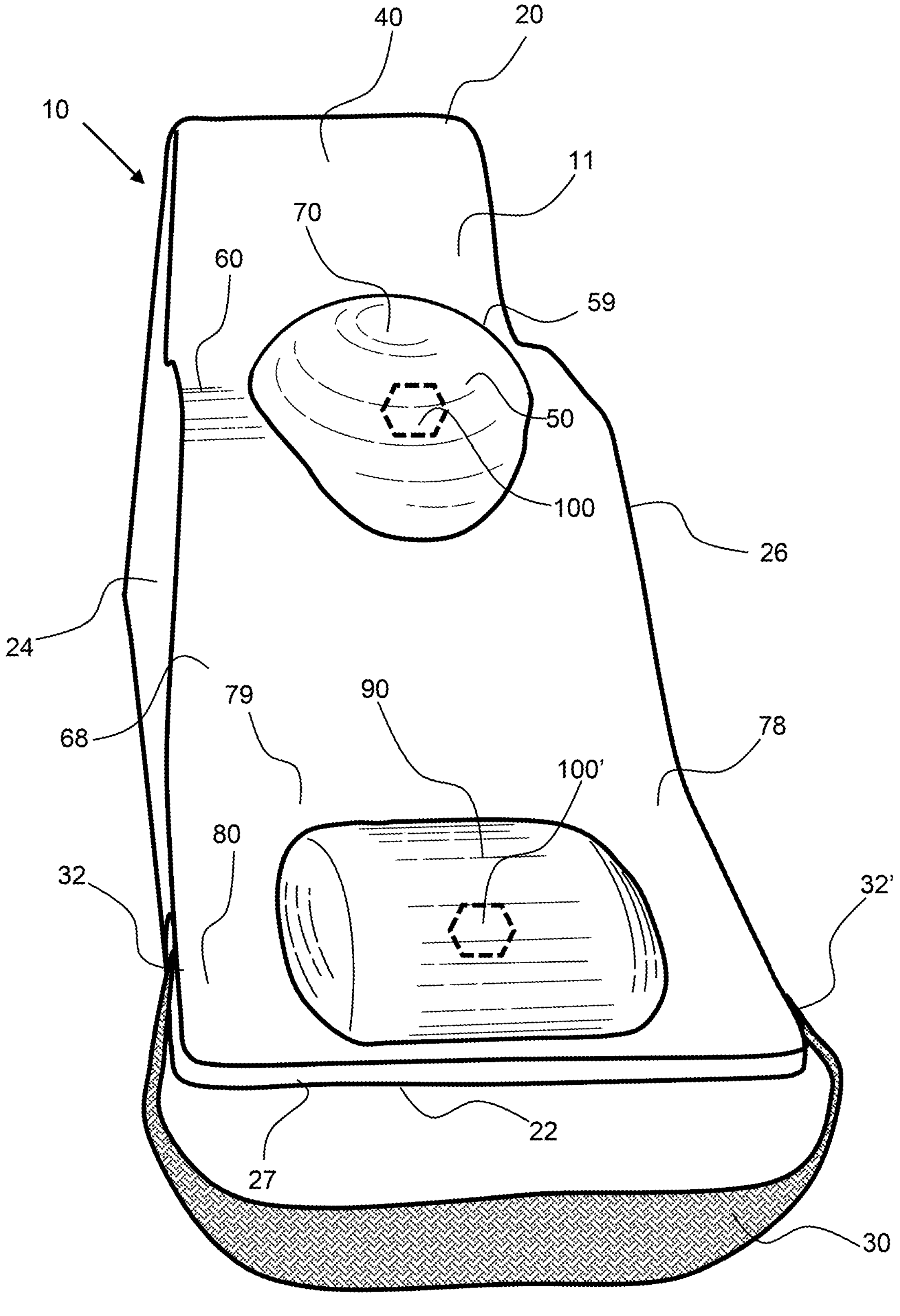
FIG. 3 shows a front perspective view of an exemplary hand wrist and forearm stretch apparatus (HWF stretch apparatus) having an upper extension, middle-landing, a middle-landing protrusion, a base-landing with a base-landing protrusion.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 4, an exemplary hand wrist and forearm stretch apparatus 10 (HWF stretch apparatus) has stretch surface 11 that extends from the base-landing 80, up along the middle-base extension 68 to the middle-landing 60 and then from the middle-landing up along the upper extension 40 to the top 20. The stretch surface may form a middle-base recess 79 between the base-landing 80 and the middle-base extension 68 which may be a concave portion of the stretch surface. Also, the stretch surface may form an upper-middle recess 59 between the middle-landing 60 and the upper extension 40. The stretch surface 11 between the middle-landing and the middle-base extension 68 may be convex in shape for comfort when performing a stretch.

An exemplary hand wrist and forearm stretch apparatus 10 has an upper extension 40, middle-landing 60, a middle-landing protrusion 70, a base-landing 80 with a base-landing protrusion 90. An upper-middle recess 59 is configured between the middle-landing protrusion and a middle-base recess 79 is configured between the middle-landing protrusion 70 and the base-landing protrusion 90. These recesses enables flexure of the hand into this recess when being stretched with a portion of the hand pressed onto the one of the protrusions and/or the upper extension. As shown the middle-landing protrusion 70 is dome shaped while the base-landing protrusion is rod or cylindrical in shape with the length of the rod extending from the left to the right side. This difference in shape between the middle-landing protrusion 70 and the base-landing protrusion 95 provides different pressure application to the palm or hand, wherein the middle-landing protrusion is more rounded or spherical and the base-landing protrusion is linear or rod shaped to spread out the force along a surface, such as the palm. Put another way, the radius of curvature of the base-landing protrusion extends from the front to the back or along the length of the hand wrist and forearm stretch apparatus.

As shown in FIGS. 1 to 4, the exemplary hand wrist and forearm stretch apparatus 10 may comprise one or more vibrating devices, 100, 100' located proximal to or within the middle-landing protrusion and proximal to or within the base-landing protrusion, respectively. As described herein, the vibration may provide enhanced triggering of the muscles, tendons or ligaments during stretching.

Figure 7:
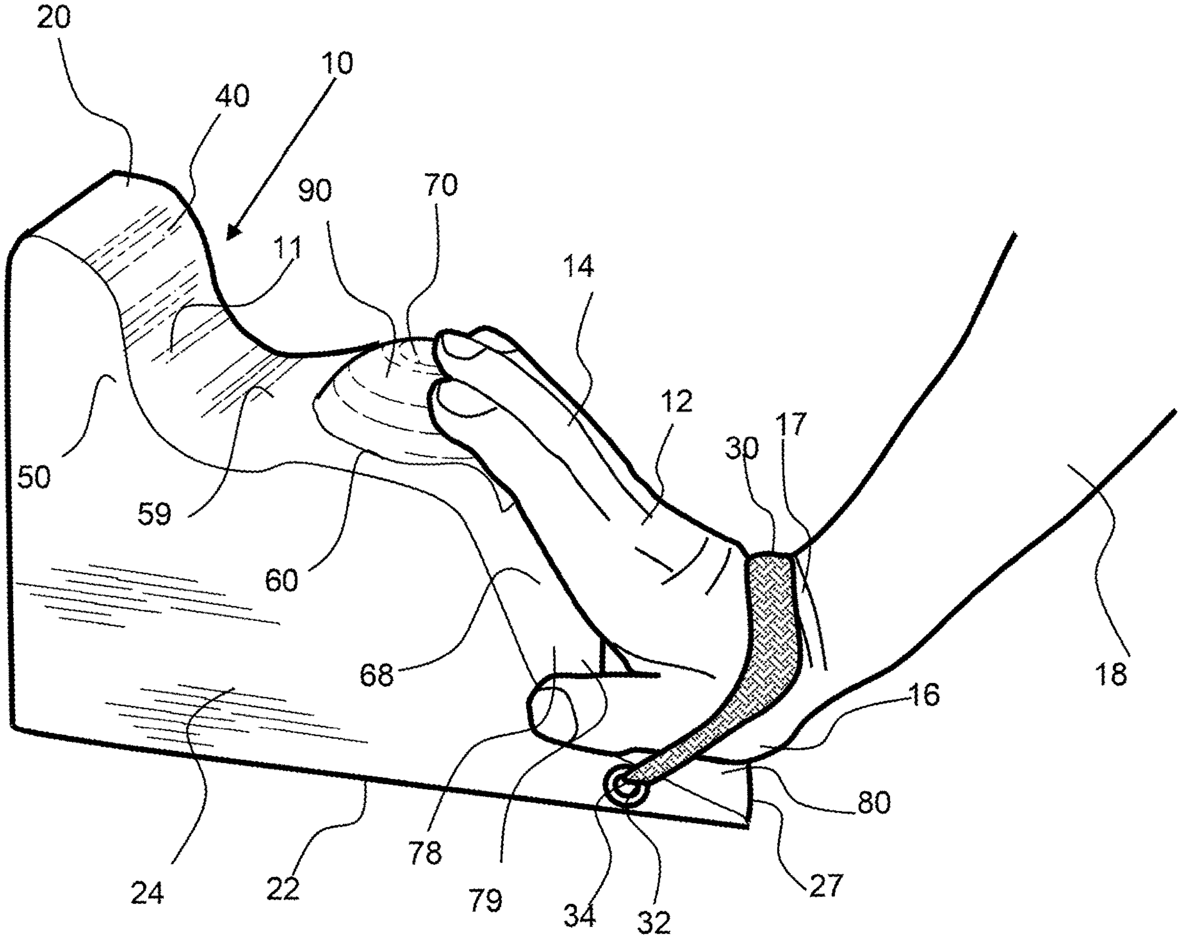
FIG. 7 shows a left-side perspective view of an exemplary hand wrist and forearm stretch apparatus (HWF stretch apparatus) with a person's hand placed with the palm on the base-landing protrusion and the fingers on the top of the middle-landing protrusion.
Figure 8:
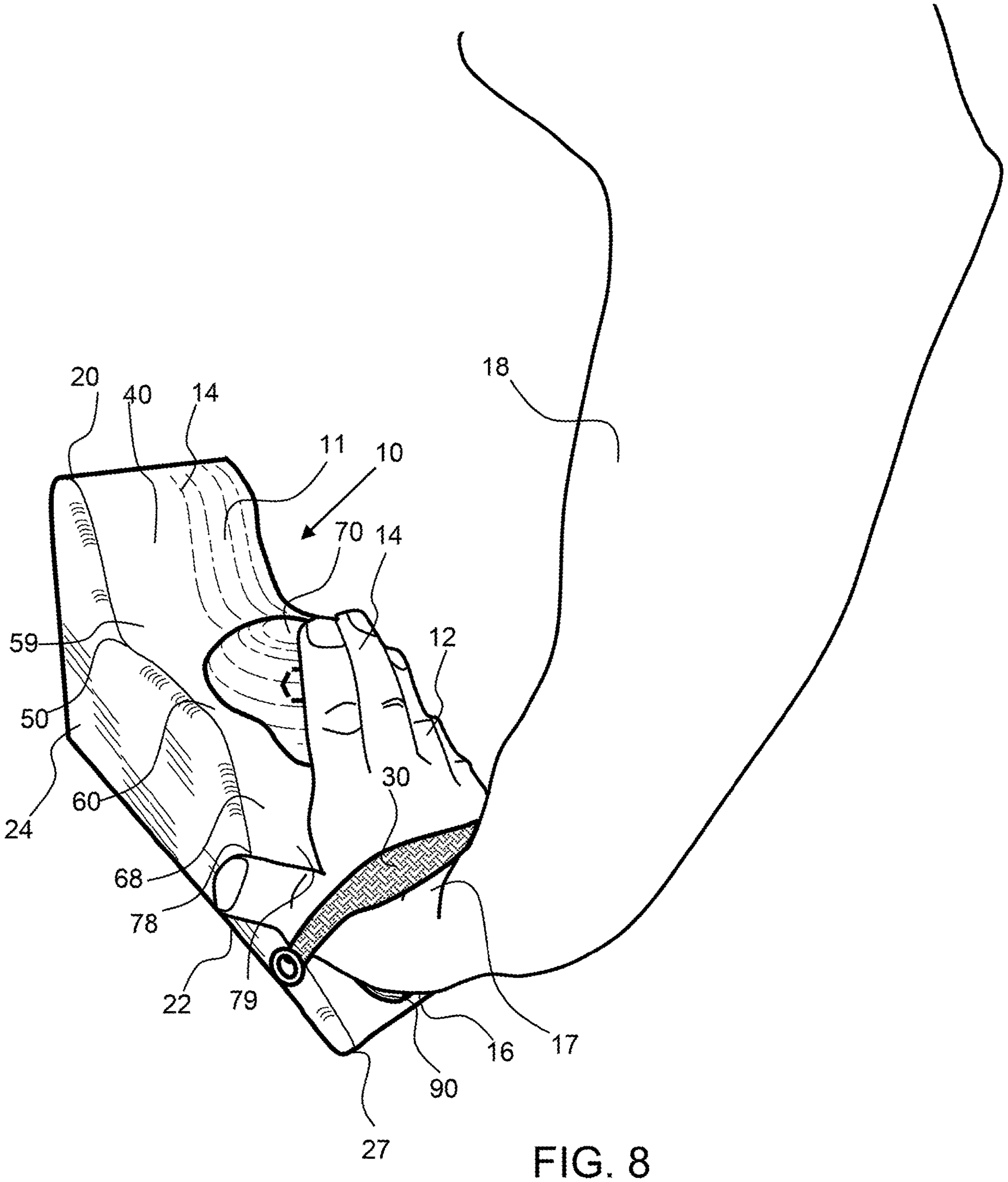
FIG. 8 shows a left-side perspective view of an exemplary hand wrist and forearm stretch apparatus (HWF stretch apparatus) with a person's hand placed with the palm on the base-landing protrusion and the fingers on the top of the middle-landing protrusion.

As shown in FIGS. 1 to 4, the exemplary hand wrist and forearm stretch apparatus 10 may comprise a retainer strap 30 that is configured to retain the hand and particularly the wrist during certain stretching and therapeutic treatments, such as those shown in FIGS. 7 and 8. The exemplary retainer strap is coupled to the hand wrist and forearm stretch apparatus 10 and may be detachably attached. The retainer strap 30 is configured to extend from the left side 24 toward the right side 26 and may have a connected end 32 coupled to the left side 24 and a connected end 32' coupled to the right side 26 of the hand wrist and forearm stretch apparatus 10. The coupled end may be coupled to a pivot 34 to enable the strap to pivot up around a person's hand for insertion and pivot down out of the way when not required for a particular stretch. The retainer strap may hold and retain a portion of the persons hand and enable push/pull stretching as described herein.

Figure 4:
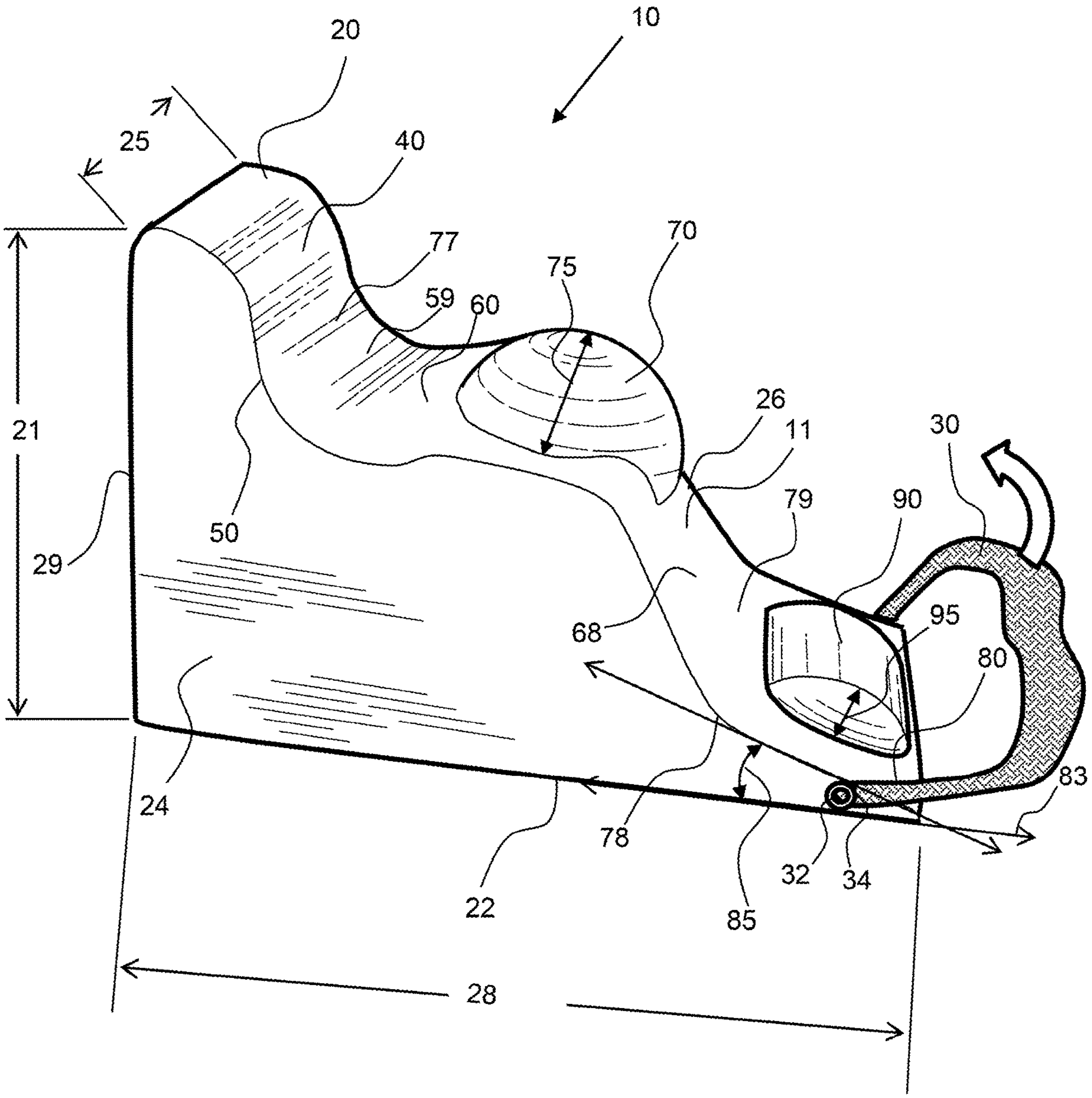
FIG. 4 shows a left-side perspective view of an exemplary hand wrist and forearm stretch apparatus (HWF stretch apparatus) having an upper extension, middle-landing, a middle-landing protrusion, a base-landing with a base-landing protrusion.

As shown in FIG. 4, the hand wrist and forearm stretch apparatus 10 has a height 21 from the top 20, to the base 22, or base, a length 28 from the front 27 to the back 29 and a width 25, from the left side 24 to the right side 26. As described herein the height may be about 10 cm or more, about 15 cm or more, about 20 cm or more, about 25 cm or more and any range between and including the height values provided. The length may be about 10 cm or more, about 15 cm or more, about 20 cm or more, about 25 cm or more and any range between and including the length values provided. The width may be about 5 cm or more, about 7.5 cm or more, about 10 cm or more, about 12.5 cm or more, about 15 cm or more, about 20 cm or more and any range between and including the width values provided.

As shown in FIG. 4, the base-landing 80 extends at a base-landing angle 85 from a base axis 83, which the base 22 extends along. This base-landing angle maybe about 25 degrees or more, about 30 degrees or more, about 40 degrees or more, about 50 degrees or more and any range between and including the angles provided. A lower angle may provide a higher degree of stretch with the fingers or upper hand located on the mid-landing protrusion 70 and the palm pressing on the base-landing protrusion 90, as shown in FIGS. 7 and 8.

Figure 5:
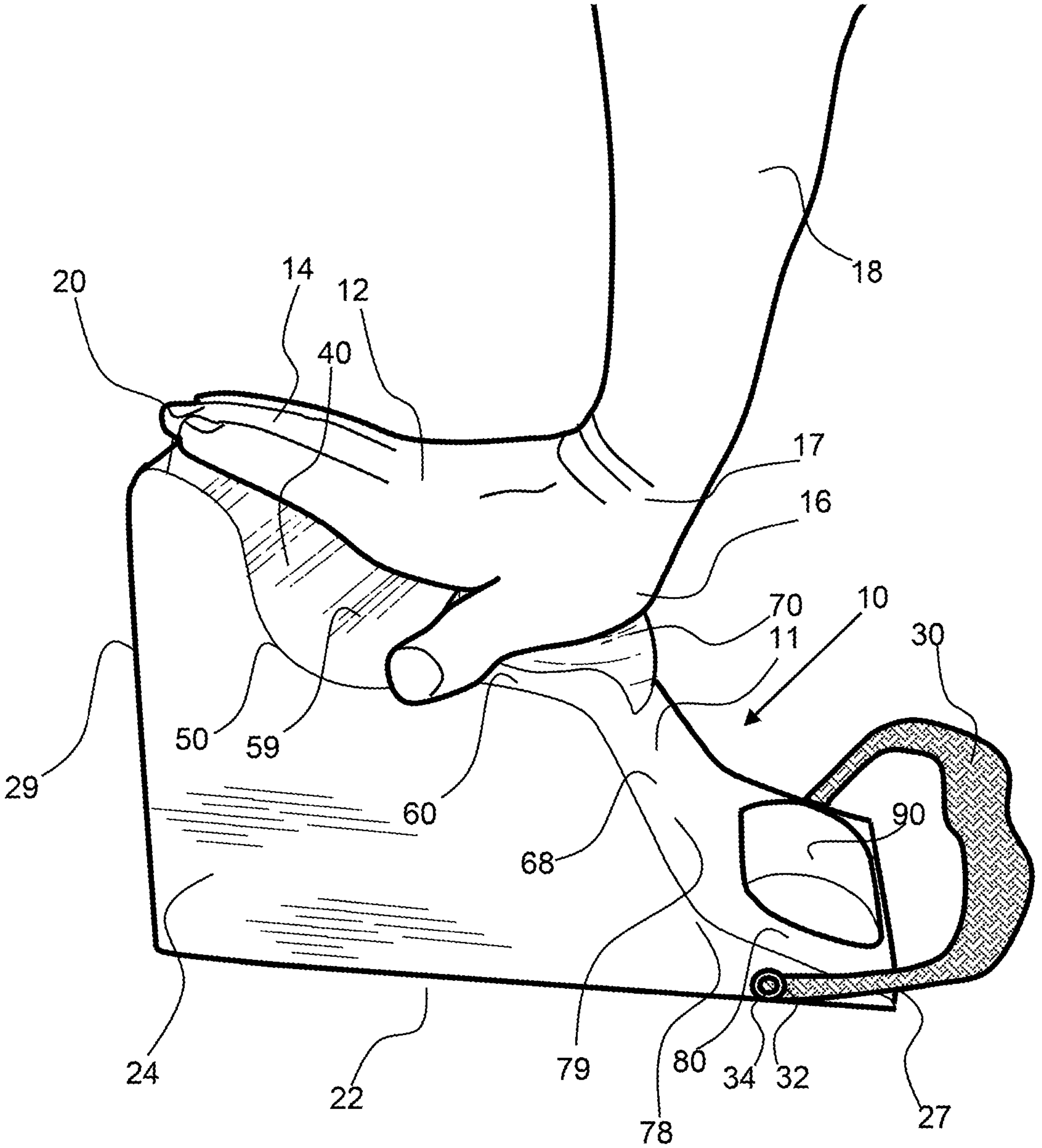
FIG. 5 shows a left-side perspective view of an exemplary hand wrist and forearm stretch apparatus (HWF stretch apparatus) with a person's hand placed with the palm on the middle-landing protrusion and the fingers on the top of the upper extension.
Figure 6:
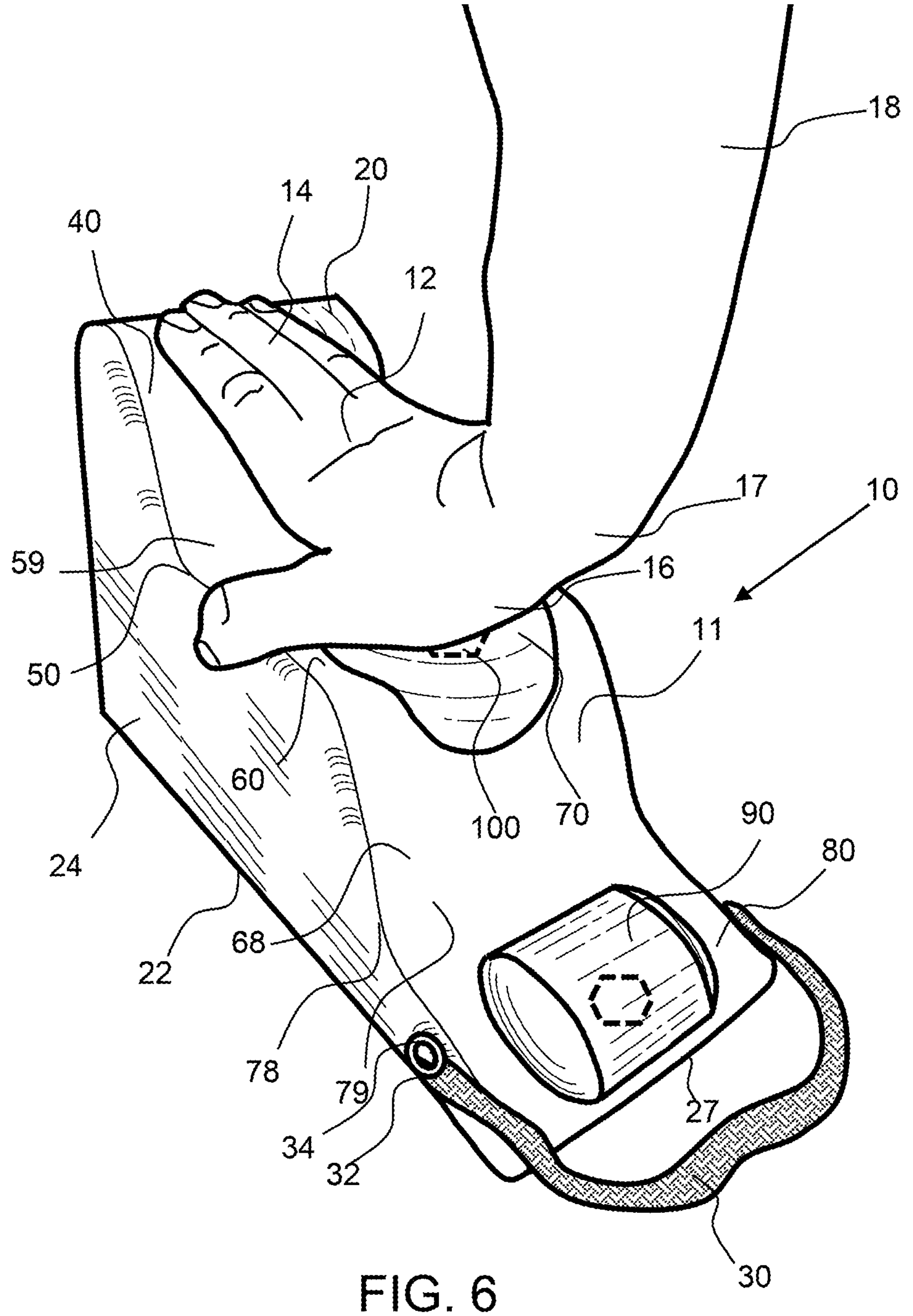
FIG. 6 shows a left-side perspective view of an exemplary hand wrist and forearm stretch apparatus (HWF stretch apparatus) with a person's hand placed with the palm on the middle-landing protrusion and the fingers on the top of the upper extension.

As shown in FIGS. 5 and 6, a person's hand 12, wrist 17 and forearm 18 are being stretched with the palm 16 being placed on the middle-landing protrusion 70 and the extended end of the fingers 14, the distal phalanges, placed on the upper extension 40. This allows the common flexure sheath and midpalmer sheaths and tendons to stretch into the upper-middle recess 59.

As shown in FIGS. 7 and 8, a person's hand 12, wrist 17 and forearm 18 are being stretched with the palm 16 being placed on the base-landing protrusion 90 and the extended end of the fingers 14, the distal phalanges, placed on the middle-landing protrusion 70. This allows the common flexure sheath and midpalmer sheaths and tendons to stretch into middle-base recess 79. The wrist 17 is retained by the retainer strap 30 to allow the palm to be pressed onto the base-landing protrusion while the fingers 14 are flexed back toward the wrist 17. The strap enable retention of the wrist to the hand wrist and forearm stretch apparatus 10 to prevent the palm from pulling away from the base-landing protrusion 90 during flexure.

The hand wrist and forearm stretch apparatus 10 has a curved surface between the upper extension 40 and the middle-landing 60 with an upper-middle inflection 50 creating a concave curved surface 77 that forms the upper-middle recess 59 between the upper extension and the middle-landing 60. The upper extension extends substantially vertically up, within about 20 degrees of vertical, from the middle-landing 60. The middle-landing extends substantially horizontally, within a bout 20 degrees of horizontal with the base1012 22, or base resting on a horizontal surface. The middle-landing protrusion 70 is a curved protrusion which may have a spherical curved surface having a diameter. The middle-landing protrusion may extend up from the middle-landing a protrusion height 75 that may be about 2.0 cm or more, about 4 cm or more, about 6 cm or more, about 7.5 cm or more and any range between and including the middle-landing protrusion heights provided. Also, the hand wrist and forearm stretch apparatus 10 has a curved surface between the middle-landing 60 and the base-landing 80 with a middle-base inflection 78 creating a concave curved surface 97 that forms the upper-middle recess 59 between the upper extension and the middle-landing 60. The base-landing protrusion 90 is a curved protrusion which may have a radius of curvature. The base-landing protrusion may extend across from a left side to a right side. The base-landing protrusion may extend up from the base-landing a protrusion heigh 95 that may be about 2.0 cm or more, about 4 cm or more, about 6 cm or more, about 7.5 cm or more and any range between and including the middle-landing protrusion heights provided.

Figure 9:
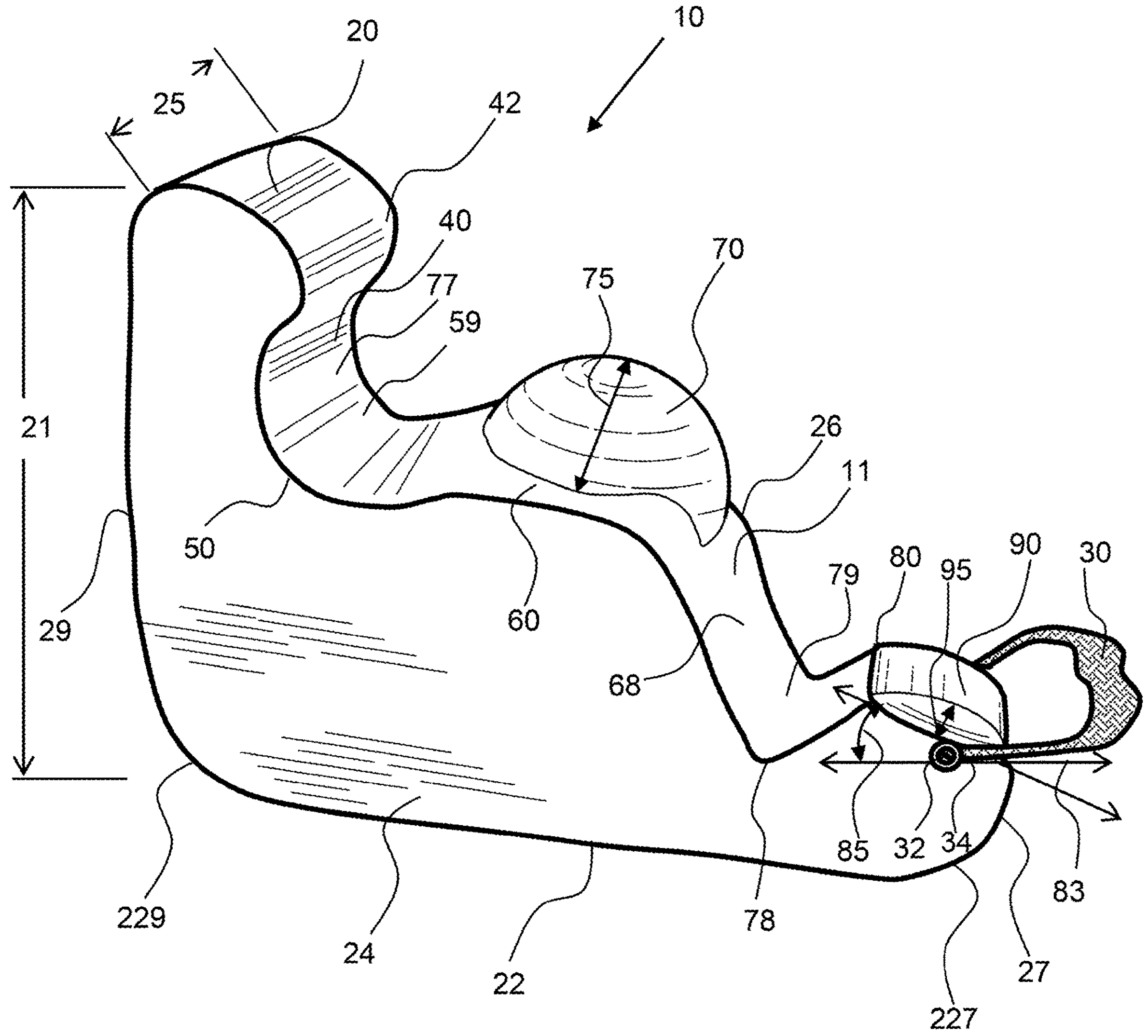
FIG. 9 shows a left-side perspective view of an exemplary hand wrist and forearm stretch apparatus (HWF stretch apparatus) having an upper protrusion.
Figure 10:
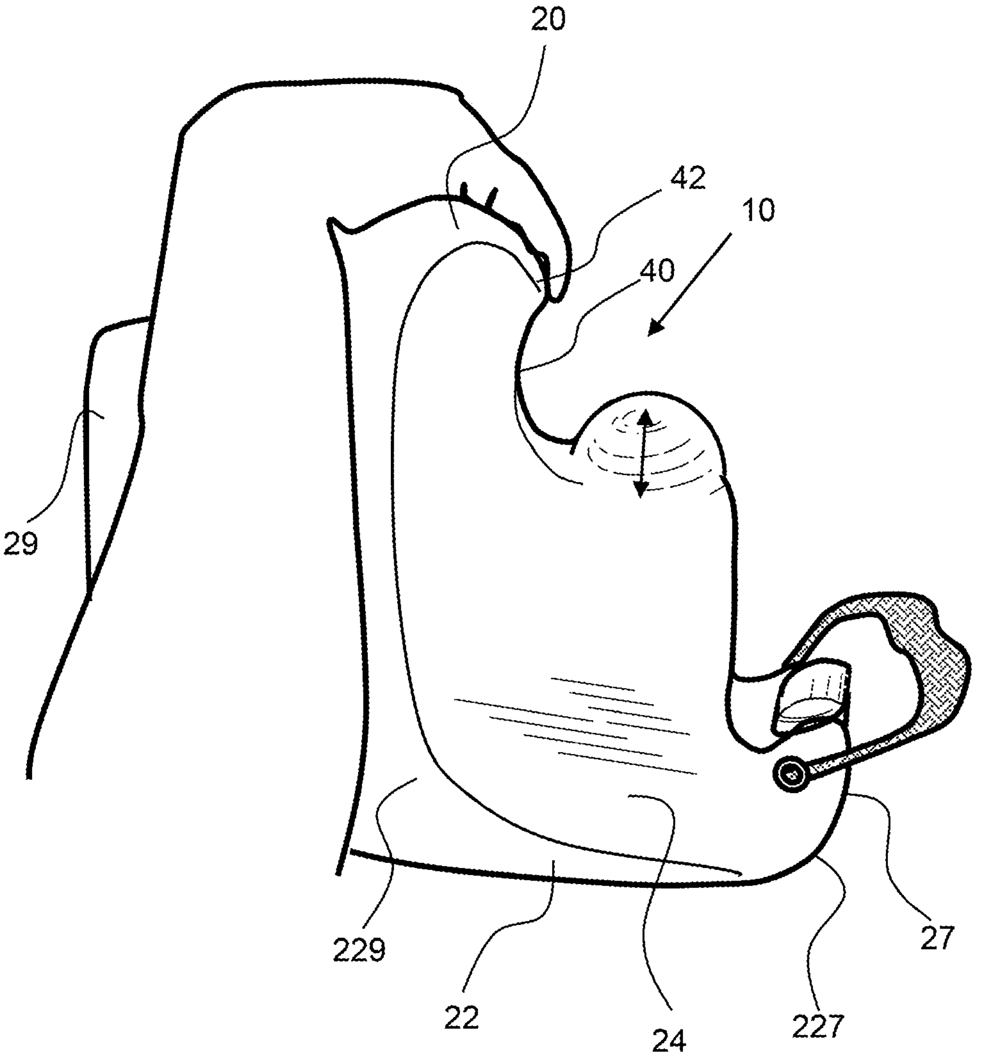
FIG. 10 shows the exemplary hand wrist and forearm stretch apparatus (HWF stretch apparatus) shown in FIG. 9 with a person's wrist extended over the top of the HWF stretch apparatus and their hand on the upper protrusion.

Referring now to FIGS. 9 and 10 the exemplary hand wrist and forearm stretch apparatus (HWF stretch apparatus) shown in FIGS. 1 to 8 has an upper protrusion 42 comprising a convex surface protrusion configured on the stretch surface 11 between the top and the concave surface 77 of the upper-middle recess 59. This upper protrusion provides a curved surface for a person to grab onto with their hand, as shown in FIG. 10 with their wrist wrapped over the top 20 of the HWF stretch apparatus and their forearm extending along the back 29. A stretch can be performed by rolling the HWF stretch apparatus forward over the curved front 27. The base-front transition surface 227 in this embodiment is curved from the base 22 to the base-landing to enable the HWF stretch apparatus to be rolled forward, wherein the base is tilted up from the back 29 side. Also note that the HWF stretch apparatus in this embodiment has a curved surface between the base 22 and the back 29 to enable rolling over this base-back transition surface 229. The stretch shown in FIG. 10 may be used to stretch the following parts of the anatomy: extensor carpi radialis *brevis*, extensor digitorum muscle, extensor carpi ulnaris muscle, abductor pollicis longus, extensor pollicis longus, and the extensor pollicis *brevis*.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hand, wrist and forearm stretch apparatus comprising:

a) a stretch surface extending from a front to a back of the hand wrist and forearm stretch apparatus and from a base to a top of said hand wrist and forearm stretch apparatus, said stretch surface comprising:
 i) an upper extension that extends vertically upward to the top and the back of the hand wrist and forearm stretch apparatus;
 ii) a base;
 iii) a middle-landing extending substantially horizontally, within 20 degrees of horizontal, between the upper extension and the base and configured vertically at least 40 mm vertically above the base and between the top of the hand wrist forearm stretch apparatus and the base;
 iv) a middle-base extension extending between the base and the middle-landing, the stretch surface further comprising a base extension positioned vertically below the middle-landing;
 v) an upper-middle recess configured between the upper extension and a middle-landing protrusion extending upward from the substantially horizontal middle-landing, the middle-landing protrusion comprises a dome shape comprising a curved surface having a radius curvature of 25 mm or more, the upper-middle recess is positioned vertically above the middle landing, the entire upper extension is positioned vertically above the upper-middle recess and the middle-landing protrusion;

wherein the upper-middle recess comprises a concave surface in the stretch surface;

b) said middle-landing protrusion extending vertically up from the middle-landing; wherein the hand wrist and forearm stretch apparatus is configured to stretch a person's hand, wrist and forearms with a palm of said hand placed on one of the middle-landing protrusion, whereby in use, a lower surface of a palm of said hand is configured for placement on the middle-landing protrusion while an upper surface of the fingers of said hand are in contact with the upper extension to place the hand in flexion with pressure applied to the palm by the middle-landing protrusion stretch the hand, said wrist and said forearm, and whereby in use, the lower surface of the palm of said hand is configured for placement on the base extension while the upper surface of the fingers of said hand are in contact with the top of the middle-landing protrusion.

2. The hand wrist and forearm stretch apparatus of claim 1, wherein the upper-middle recess comprises a concave surface in the stretch surface.

3. The hand wrist and forearm stretch apparatus of claim 1, wherein the middle-base recess comprises a concave surface in the stretch surface.

4. The hand wrist and forearm stretch apparatus of claim 1, wherein the middle-landing protrusion extends from the middle-landing onto the middle-base extension.

5. The hand wrist and forearm stretch apparatus of claim 1, wherein the curved surface of the middle-landing protrusion is a spherical curved surface.

6. The hand wrist and forearm stretch apparatus of claim 1, wherein the stretch surface further comprises a base landing extending from the base extension and the base landing is configured between the middle-landing and the front of the hand wrist and forearm stretch apparatus.

7. The hand wrist and forearm stretch apparatus of claim 6, wherein the base landing has a base-landing protrusion that has a curved surface.

8. The hand wrist and forearm stretch apparatus of claim 7, wherein the curved surface of the base-landing protrusion extends in a radius of curvature that is 10 mm or more.

9. The hand wrist and forearm stretch apparatus of claim 8, further comprising a vibrator configured in the base landing and configured to vibrate the base-landing protrusion wherein the base-landing extends at a base-landing angle of at least 25 degrees from a base axis of the forearm stretch apparatus.

10. The hand wrist and forearm stretch apparatus of claim 6, wherein the base-landing extends at a base-landing angle of at least 25 degrees from a base axis of the forearm stretch apparatus.

11. The hand wrist and forearm stretch apparatus of claim 1, further comprising a vibrator configured within the middle-landing protrusion and configured to vibrate the middle-landing protrusion.

12. The hand wrist and forearm stretch apparatus of claim 1, further comprising a retainer strap coupled to the hand wrist and forearm stretch apparatus and configured to extend from the left side to the right side.

13. The hand wrist and forearm stretch apparatus of claim 12, wherein the retainer strap is detachably attachable to the hand wrist and forearm stretch apparatus.

14. The hand wrist and forearm stretch apparatus of claim 12, wherein the retainer strap is coupled to a pivot and configured to pivot up over the base-landing.

15. The hand wrist and forearm stretch apparatus of claim 1, further comprising a vibrator configured within the hand wrist and forearm stretch apparatus and configured to vibrate the hand wrist and forearm stretch apparatus.

16. The hand wrist and forearm stretch apparatus of claim 1, further comprising an upper protrusion configured between the top and the upper-middle recess and comprising a convex surface in the stretch surface.

17. The hand wrist and forearm stretch apparatus of claim 1, further comprising a base-front transition surface that is curved to enable the hand wrist and forearm stretch apparatus to roll forward over said base-front transition surface.

18. A method of stretching the hand comprising:

a) providing the hand wrist and forearm stretch apparatus of claim 1;

b) providing a person's hand having a palm and fingers;

c) placing said person's hand onto the middle-landing protrusion;

d) extending said fingers onto the upper extension.

19. The method of claim 18, further comprising pressing said palm down onto the middle-landing protrusion and pressing the fingers onto the upper extension and flexing the midpalmer region of the hand.

* * * * *